Patented Feb. 24, 1931

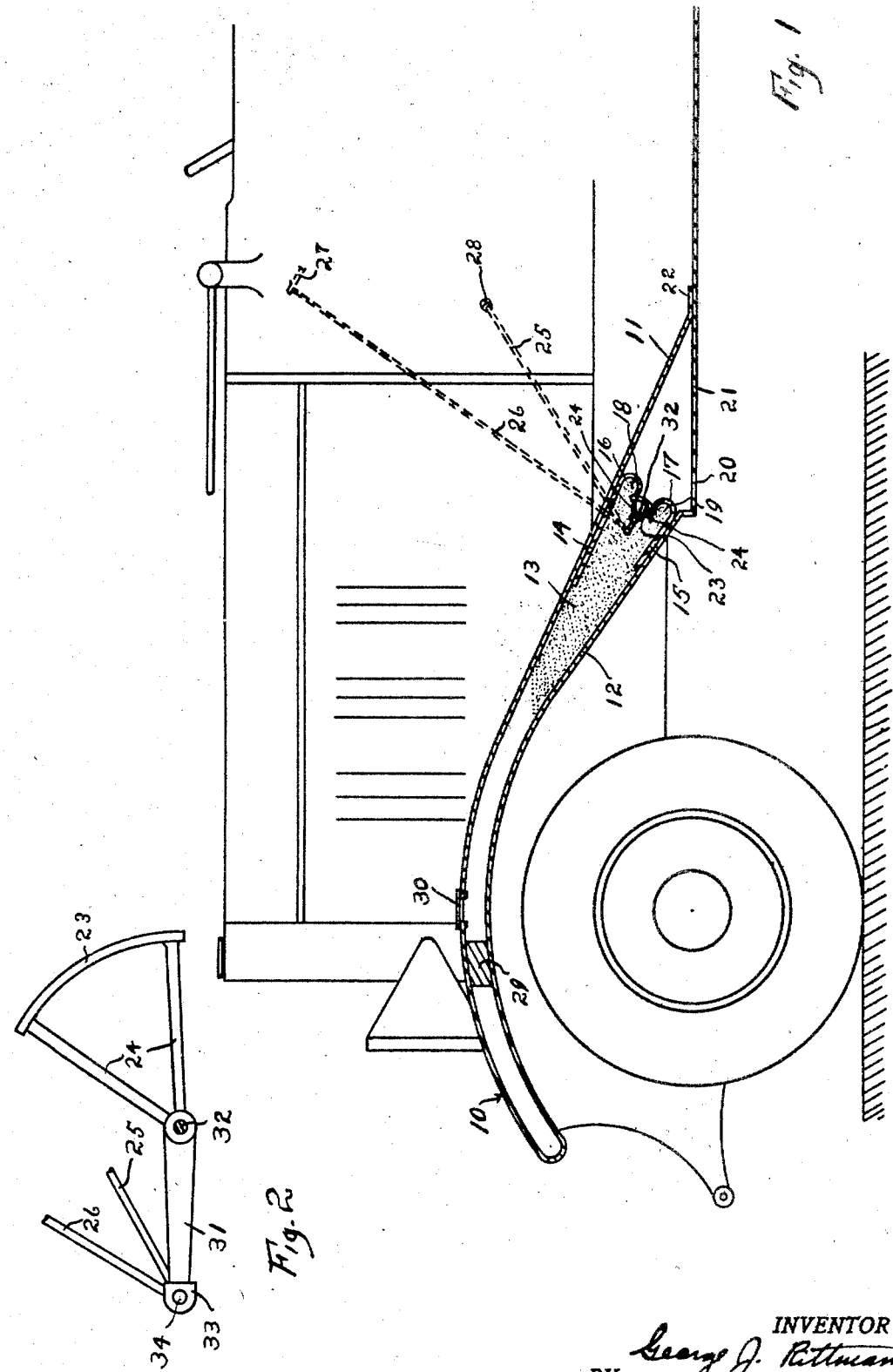

1,794,032

UNITED STATES PATENT OFFICE.

GEORGE J. RITTMANN, OF TRENTON, NEW JERSEY

SANDER

Application filed August 9, 1930. Serial No. 474,141.

This invention relates to a sanding device adapted to be incorporated in an automobile fender for the purpose of discharging sand onto icy or slippery roads for the purpose of affording increased traction. The principal object of the invention is to provide such a sanding device of superior construction which shall be conveniently controlled, capable of producing an even and certain flow of sand when the same is desired, preventing the clogging up of discharge openings by mud or water, and which shall have the simplest and least complicated structure consistent with the attainment of the foregoing objects.

Fig. 1 is a schematic partial sectional view showing the construction as applied to one of the fenders of an automobile and Fig. 2 is an enlarged detail view showing the connection of the control rods to the movable valve part.

In carrying out my invention, I prefer to provide each of the front fenders of an automobile with a sanding device, the same being incorporated therein as an integral part. Only one of the fenders is shown in the drawings but it will be understood that the other is of substantially the same construction. The fender comprises a hollow sheet metal structure indicated generally by the numeral 10 and provided at the bottom thereof with a valve structure and an opening 20 through which sand delivered by such valve structure may flow onto the road. The upper and lower walls 11 and 12 of the fender 10 preferably diverge downwardly to provide receptacle space for containing the sand and a pair of plates 14 and 15 having retrorse edges are attached to the walls 11 and 12 by any suitable means, such as spot welding. The curved portions 16 and 17 of the plates 14 and 15 are of such configuration, as shown, as to contain a small quantity of sand. Mounted on a shaft 32 which is suitably journaled with respect to the fender 10 is an arcuate movable valve portion 23 the upper and lower edges of which can be moved into closing engagement with the pocket edges 18 and 19. The coarse grains or aggregations of sand will accumulate in these pockets, and this construction has proved in practice to allow the sand to run more freely and thereby secure certain and more even discharge thereof when the controls are operated. Mounted on the shaft 32 which may be connected to the rotatable valve member 23 of both fenders is an arm 31 connected by means of rods 25 and 26 to foot and hand controls 27 and 28. While I have shown both a foot and a hand control, connected to the same rod which is connected to the said arm 31 at 34, it is obvious that either one of these may be dispensed with if the driver or manufacturer is willing to accept the smaller convenience resulting from such omission.

It is contemplated that the foot control 28 shall be positioned at one convenient point on the floor boards adjacent the driver's foot and that the control 27 will be positioned on the dash either by the mechanism shown or some other superior or more complex device for actuating the rod 26.

It will be noted that the opening 20 which allows the sand to escape through the plate 21 to the road is positioned adjacent to and immediately behind a small vertical portion of the fender which joins the parts 12 and 21. By this construction, a certain degree of shielding for the opening 20 is obtained and the said opening is out of direct alignment with any mud or water which may be thrown from the vehicle wheel by a centrifugal action as well as being protected from water which may run down the lower fender wall 12 from a higher point.

The angular relation between the arms 24 and 31 may be whatever desired. Any suitable springs and/or stops (not shown) may be employed for retaining the member 23 normally in valve closing relation to the curved plate portions 16 and 17.

While I have shown and described a preferred embodiment of my invention, I wish it understood that I am not limited to the details thereof but may carry out my invention in numerous forms within the scope of the appended claims.

Having thus described my invention, what I claim is:—

1. In combination in a motor vehicle, a fender, a sand receptacle incorporated in said fender, and a valve at the lower part of said receptacle adapted to be operated optionally by a hand or foot control means, hand and foot control means connected in operating relation to said valve, said control means being positioned for convenient operation by the driver of the vehicle, said valve including a pair of opposed downwardly extending plates with retrorse end portions forming substantially aligned pockets and an arcuate rotary member pivotally mounted with respect to said pockets and adapted to cooperate with the edges of said retrorse end portions to close said valve.

2. In combination in a motor vehicle, a fender, a sand receptacle incorporated in said fender, and a valve at the lower part of said receptacle, said valve including a pair of opposed downwardly extending plates with retrorse end portions forming substantially aligned pockets and an arcuate rotary member pivotally mounted with respect to said pockets and adapted to cooperate with the edges of said retrorse end portions to close said valve.

3. In combination in a motor vehicle, a fender, a sand receptacle incorporated in said fender, and a valve at the lower part of said receptacle adapted to be operated optionally by a hand or foot control means, hand and foot control means connected in operating relation to said valve, said control means being positioned for convenient operation by the driver of the vehicle, said valve including a pair of opposed downwardly extending plates with retrorse end portions forming substantially aligned pockets and a rotary member pivotally mounted with respect to said pockets and adapted to cooperate with the edges of said retrorse end portions to close said valve.

4. In combination in a motor vehicle, a fender, a sand receptacle incorporated in said fender, and a valve at the lower part of said receptacle adapted to be operated optionally by a hand or foot control means, hand and foot control means connected in operating relation to said valve, said control means being positioned for convenient operation by the driver of the vehicle, said valve including a pair of opposed downwardly extending plates with retrorse end portions forming substantially aligned pockets and an arcuate rotary member pivotally mounted with respect to said pockets and adapted to cooperate with the edges of said retrorse end portions to close said valve, said fender having a vertical portion adjacent the bottom thereof and being provided with a sand delivery opening in the bottom behind said vertical portion.

In testimony whereof, I hereunto affix my signature.

GEORGE J. RITTMANN.